US012747756B2

(12) United States Patent
Liu et al.

(10) Patent No.: US 12,747,756 B2
(45) Date of Patent: Sep. 29, 2026

(54) CASSETTE SEAL AND ROLLING BEARING

(71) Applicant: Schaeffler Technologies AG & Co. KG, Herzogenaurach (DE)

(72) Inventors: Xin Liu, Shanghai (CN); Lijuan Wu, Suzhou (CN); Alexander Käbe, Schweinfurt (DE); Alexander Tietz, Obbach (DE); Uwe Niebling, Neustadt an der Aisch (DE); Nan Lu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 26 days.

(21) Appl. No.: 18/865,421

(22) PCT Filed: Apr. 28, 2023

(86) PCT No.: PCT/DE2023/100311
§ 371 (c)(1),
(2) Date: Nov. 13, 2024

(87) PCT Pub. No.: WO2023/222154
PCT Pub. Date: Nov. 23, 2023

(65) Prior Publication Data

US 2025/0320897 A1 Oct. 16, 2025

(30) Foreign Application Priority Data

May 17, 2022 (DE) ..................... 10 2022 112 274.3

(51) Int. Cl.
*F16C 19/06* (2006.01)
*F16C 19/52* (2006.01)
(Continued)

(52) U.S. Cl.
CPC .......... *F16C 33/7823* (2013.01); *F16C 19/06* (2013.01); *F16C 19/52* (2013.01);
(Continued)

(58) Field of Classification Search
CPC ...... F16C 19/06; F16C 19/52; F16C 33/7863; F16C 33/7866; F16C 33/7883; F16C 33/80; F16C 33/805; F16C 41/002
See application file for complete search history.

(56) References Cited

U.S. PATENT DOCUMENTS 3,564,477 A * 2/1971 Pompei ................ H01R 39/643
439/271
10,302,133 B2 5/2019 Song
(Continued)

FOREIGN PATENT DOCUMENTS

CN 111219417 A 6/2020
DE 102008017409 A1 10/2009
(Continued)

*Primary Examiner* — Phillip A Johnson
(74) *Attorney, Agent, or Firm* — Volpe Koenig

(57) ABSTRACT

A cassette seal includes an annular centrifugal disc and a seal disc. An elastic annular seal element is connected to the seal disc, and the seal element has a plurality of contactless seal lips, each of which extends from the seal element in the direction of the centrifugal disc such that a labyrinth is defined between the seal element and the centrifugal disc. The seal element has a first seal lip which extends radially outwards and axially in the direction of the centrifugal disc, a second seal lip which is offset radially inwards and axially relative to the first seal lip in the direction of the centrifugal disc and which extends radially outwards and axially in the direction of the centrifugal disc, and a third seal lip which extends radially outwards and axially in the direction of the centrifugal disc and which is offset radially inwards and axially in the direction of the centrifugal disc relative to the second seal leap, wherein a first groove is formed between the first seal lip and the seal element, a second groove is formed between the second seal lip and the seal element, and a third groove is formed between the third seal lip and the seal element.

12 Claims, 5 Drawing Sheets

(51) Int. Cl.
*F16C 33/78* (2006.01)
*F16C 41/00* (2006.01)

(52) U.S. Cl.
CPC ........ *F16C 33/7883* (2013.01); *F16C 41/002* (2013.01); *F16C 2202/32* (2013.01)

(56) References Cited

U.S. PATENT DOCUMENTS

| | | | | |
|---|---|---|---|---|
| 2004/0046441 | A1* | 3/2004 | Ohtsuki | F16C 19/186 301/124.1 |
| 2012/0207417 | A1* | 8/2012 | Walter | F16J 15/3264 277/411 |
| 2013/0127119 | A1 | 5/2013 | Haepp | |
| 2015/0097340 | A1* | 4/2015 | Gulli | F16C 33/80 277/349 |
| 2015/0337961 | A1 | 11/2015 | Miletto et al. | |
| 2019/0010989 | A1 | 1/2019 | Falaschi et al. | |
| 2020/0141448 | A1 | 5/2020 | Kim et al. | |

FOREIGN PATENT DOCUMENTS

| | | | | | |
|---|---|---|---|---|---|
| DE | 102008030710 | A1 | | 12/2009 | |
| DE | 102015224418 | A1 | * | 6/2017 | F16J 15/324 |
| DE | 102017129721 | A1 | * | 6/2019 | F16J 15/324 |
| DE | 102018105832 | A1 | * | 9/2019 | F16J 15/447 |
| EP | 836021 | A2 | * | 4/1998 | |
| EP | 0972962 | A2 | * | 1/2000 | F16C 41/007 |
| EP | 3477137 | B1 | | 10/2020 | |
| EP | 4075003 | A1 | | 10/2022 | |
| KR | 100731779 | B1 | * | 6/2007 | F16C 33/805 |
| WO | 2022161735 | A1 | | 8/2022 | |

* cited by examiner

CASSETTE SEAL AND ROLLING BEARING

CROSS-REFERENCE TO RELATED APPLICATIONS

This application is the U.S. National Phase of PCT Appln. No. PCT/DE2023/100311 filed Apr. 28, 2023, which claims priority to DE 10 2022 112 274.3 filed May 17, 2022, the entire disclosures of which are incorporated by reference herein.

TECHNICAL FIELD

The present disclosure relates to a cassette seal for a rolling bearing, which can be positioned between two bearing rings which are arranged coaxially with respect to one another and which are rotatable relative to one another, comprising an annular centrifugal disk, which is fixed in a rotationally fixed manner to one of the bearing rings, and a seal disk, which is fixed in a rotationally fixed manner to the other of the bearing rings, wherein an elastic, annular seal element is connected to the seal disk, and the seal element has a plurality of contactless seal lips, each of which extends from the seal element in the direction of the centrifugal disk, such that a labyrinth is defined between the seal element and the centrifugal disk. The disclosure further relates to a rolling bearing.

BACKGROUND

Rolling bearing assemblies are well known from the prior art. There are a number of problems related to the contamination of rolling bearings. Most attempts are made to solve the problem by using sealing rings with a plurality of seal lips, but this increases the torque and heat generation within the bearing and consequently requires more energy to rotate the bearing.

Agricultural applications, for example in agricultural machinery or vehicles such as tractors, pose particular challenges for such bearings. Owing to the surface on which the vehicle is driven, such applications present very challenging load profiles for rolling bearings. At the same time, the ingress of contaminants into the bearing can damage the bearing and lead to premature functional failure. Similar load cases are also known from the field of rail-bound vehicles.

There is therefore a continuing need to improve the sealing properties of rolling bearings, especially when they are exposed to high levels of dirt load or water exposure.

In this context, it is generally known to a person skilled in the art in rolling bearing technology that sealing systems in the form of so-called cassette seals are used, among other things, to seal intermediate spaces between two components which are arranged coaxially with respect to one another and are rotatable relative to one another, such as a shaft running in a housing or an inner ring and an outer ring of a rolling bearing. The purpose of these sealing systems is to prevent lubricant from escaping outwards from the intermediate space between the rotatable components and to prevent solid, liquid and/or gaseous media from penetrating into this intermediate space from the outside. Sealing must be ensured both in the static case, i.e. when both components are at a standstill, and in the dynamic case, when components are rotating. A cassette seal normally consists of a seal disk with seal lips and a centrifugal disk arranged in front of it. The seal disk prevents the media from passing between the two separate spaces via the contact pressure of the seal lips, while the centrifugal disk, when rotating, causes the media impinging on the seal from the outside to be repelled due to the centrifugal force.

DE 10 2008 030 710 A1 discloses such a sealing system in cassette form for a rolling bearing, which consists of a seal disk arranged on the inside in the axial direction with an L-shaped profile cross-section and a centrifugal disk arranged on the outside in the axial direction, also with an L-shaped profile cross-section. In this case, the seal disk with its axial profile leg is connected to an outer ring of the rolling bearing, while the centrifugal disk with its axial profile leg is mounted on an inner ring of the rolling bearing. The radial profile legs of both disks protrude into the intermediate space between the inner ring and outer ring of the rolling bearing and define a rectangular cross-sectional area of the sealing system. Furthermore, the seal disk has an elastomer seal lip at the end of its radial profile leg, said elastomer seal lip being in contact with the centrifugal disk in the radial direction, while the centrifugal disk has a further elastomer seal lip on its radial profile leg, said further elastomer seal lip being in contact with the seal disk in the axial direction at least when the rolling bearing is at a standstill.

Such cassette seals, for example, show good performance in preventing grease leakage from a lubricated rolling bearing and can usually effectively prevent external contaminants from penetrating into the interior of the rolling bearing.

SUMMARY

It is the object of the disclosure to provide a cassette seal, in particular for a rolling bearing, which has the lowest possible friction while maintaining a high sealing effect. It is furthermore the object of the disclosure to create a rolling bearing with an improved cassette seal.

This object is achieved by a cassette seal, in particular for a rolling bearing, which can be positioned between two bearing rings which are arranged coaxially with respect to one another and which are rotatable relative to one another, comprising an annular centrifugal disk which is fixed in a rotationally fixed manner to one of the bearing rings, and a seal disk which is fixed to the other of the bearing rings in a rotationally fixed manner, and an elastic, annular seal element is connected to the seal disk, and the seal element has a plurality of contactless seal lips, each of which extends from the seal element in the direction of the centrifugal disk, such that a labyrinth is defined between the seal element and the centrifugal disk, and the seal element has a first seal lip extending radially outwards and axially in the direction of the centrifugal disk, a second seal lip which is offset radially inwards and axially with respect to the first seal lip in the direction of the centrifugal disk and which extends radially outwards and axially in the direction of the centrifugal disk, and a third seal lip which extends radially outwards and axially in the direction of the centrifugal disk and which is arranged offset radially inwards and axially in the direction of the centrifugal disk in relation to the second seal lip, and a circumferential first groove extending in the radial direction is formed between the first seal lip and the seal element, a circumferential second groove extending in the radial direction is formed between the second seal lip and the seal element, and a circumferential third groove extending in the radial direction is formed between the third seal lip and the seal element.

The cassette seal can therefore provide high sealing performance while maintaining very low friction torque.

Owing to the grooves which are formed in the seal element and are arranged radially and axially offset with respect to one another in a step-like manner, a collecting reservoir can be created for a dirt load entering the cassette seal, in particular for a static operating state of the cassette seal, which prevents larger amounts of dirt load from migrating radially inwards through the cassette seal.

The individual elements of the claimed subject matter of the disclosure are explained first in the order in which they are mentioned in the claims, after which particularly preferred embodiments of the subject matter of the disclosure are described.

Rolling bearings can be used in particular to enable rotary movements with the lowest possible frictional losses. Rolling bearings can be used in particular to affix and/or mount axles and shafts, and, depending on the design, they can absorb radial and/or axial forces and simultaneously enable the rotation of the shaft or the components mounted on an axle in this way.

For this purpose, rolling bodies are arranged so as to roll between an inner ring and an outer ring of the rolling bearing. Between these three main components—inner ring, outer ring and the rolling bodies—it is usually mainly rolling friction that occurs within the rolling bearing. Since the rolling bodies in the inner and outer ring can preferably roll on hardened steel surfaces with optimized lubrication, the rolling friction of such bearings is relatively low. A rolling bearing can be of single-row or multi-row design.

The rolling bearing according to the disclosure or the cassette seal according to the disclosure can be used, for example, in particular in a vehicle that is cleaned with high-pressure cleaners. Examples of this in particular would be off-road vehicles, mountain bikes, off-road motorcycles, tractors, rail-bound vehicles, etc. In general, the cassette seal according to the disclosure can be used advantageously in applications with a large dirt load.

The inner ring can in particular connect the shaft accommodating the rolling bearings to the rolling bearing or the rolling bodies. In particular, the shaft can be connected to the side of the lateral surface of the inner ring facing the shaft, wherein the rolling bodies of the rolling bearing roll on the inner ring raceway opposite this lateral surface. Preferably, the centrifugal disk is coupled to the inner ring in a rotationally fixed manner.

The inner ring can be made of a metallic and/or ceramic material. In principle, it is conceivable to design the inner ring in one piece or in multiple pieces, in particular in two pieces.

The outer ring can, in particular, connect the bearing system accommodating the rolling bearings to the rolling bearing or the rolling bodies. In particular, the bearing system can be connected to the side of the lateral surface of the outer ring facing the bearing system, and the rolling bodies of the rolling bearing roll on the outer ring raceway opposite this lateral surface. The outer ring can be made of a metallic and/or ceramic material. In principle, it is conceivable to design the outer ring in one piece or in multiple pieces, in particular in two pieces. Preferably, the seal disk is connected to the outer ring in a rotationally fixed manner.

Depending on the type of rolling bearing, the rolling bodies have the shape of a ball or a roller. They roll on the raceways of the rolling bearing and have the task of transmitting the force acting on a radial rolling bearing from the outer ring to the inner ring and vice versa. In an axial rolling bearing, the rolling bodies transmit the forces acting on the axial rolling bearing between the running discs. Roller-like rolling bodies are also referred to as roller rolling bodies and spherical rolling bodies as bearing balls.

Roller-like rolling bodies can be selected, for example, from the group of symmetrical spherical rollers, asymmetrical spherical rollers, cylindrical rollers, needle rollers and/or tapered rollers.

Rolling bodies can be guided and spaced apart in a cage or by rolling body spacers. In principle, it is also conceivable to design a rolling bearing without a cage, which is also referred to as a full-complement rolling bearing. In full-complement rolling bearings, adjacent rolling bodies can contact one another.

The rolling bodies can roll within the rolling bearing, in particular on the inner ring raceway of the inner ring. For this purpose, the surface of the inner ring raceway can advantageously be designed to be abrasion-resistant, for example by means of a corresponding surface treatment method and/or by applying a corresponding additional layer of material.

The inner ring raceway can be designed to be planar or profiled. A profiled design of the inner ring raceway can be used, for example, to guide the rolling bodies on the inner ring raceway. On the other hand, a planar formation of the inner ring raceway can, for example, allow a certain axial displaceability of the rolling bodies on the inner ring raceway.

The rolling bodies can roll within the rolling bearing, in particular on the outer ring raceway of the outer ring. For this purpose, the surface of the outer ring raceway can advantageously be designed to be correspondingly abrasion-resistant, for example by means of a corresponding surface treatment method and/or by applying a corresponding additional layer of material.

The outer ring raceway can be designed to be planar or profiled. A profiled design of the outer ring raceway can be used, for example, to guide the rolling bodies on the outer ring raceway. On the other hand, a planar formation of the outer ring raceway can, for example, allow a certain axial displaceability of the rolling bodies on the outer ring raceway.

A rolling bearing according to the disclosure can have a seal, in particular a cassette seal, to prevent lubricant from escaping from the rolling bearing or dirt or moisture from entering the rolling bearing. For this purpose, the seals used can be provided with one or more seal lips, which can bear against a component of the rolling bearing. These are designed in such a way that, on the one hand, they seal the bearing as long as possible over its entire service life, and on the other hand, the level of friction caused by the contiguous seal is not too high.

The inner ring may have an inner ring recess. In particular, a seal can be arranged in an inner ring recess. Preferably, the inner ring recess is formed as a circumferential groove in the inner ring.

The outer ring can have an outer ring recess. In particular, a seal can be arranged in an outer ring recess. Preferably, the outer ring recess is formed as a circumferential groove in the outer ring.

According to an advantageous embodiment of the disclosure, it is possible for the first groove and/or the second groove and/or the third groove to form a V-shaped or U-shaped contour in cross-section.

It is particularly preferred that the seal element is formed from an elastic, in particular preferably rubber-elastic material. The elastic material can preferably consist entirely or partially of an elastomer, wherein the elastomers in turn are preferably selected from the group of natural rubber vulcanizates and silicone rubber.

Preferably, the seal lips are formed integrally, in particular monolithically, with the seal element.

According to an advantageous embodiment of the disclosure, it is possible for the first seal lip and the second seal lip to have an angle with respect to a radial plane which is selected between 20° and 60°, which has proven to be particularly effective for achieving a high sealing performance with low frictional moments.

According to a further preferred development of the disclosure, it is possible for the seal element to have an annular first sealing portion which is arranged offset outwards in the radial direction with respect to the first seal lip and extends in the axial direction from the seal element in the direction of the centrifugal disk, such that the sealing portion axially covers the centrifugal disk and defines an annular first channel portion between the sealing portion and the centrifugal disk, wherein the first channel portion runs towards the first groove of the seal element, which also has a positive influence on the sealing performance of the cassette seal.

Furthermore, according to a likewise advantageous embodiment of the disclosure, it is possible for the first seal lip and the centrifugal disk to define an annular second channel portion which extends in the radial direction and which runs towards the second groove of the seal element. The advantageous effect of this design is based on the fact that, for example, in a static operating state of the cassette seal, as occurs when the rolling bearing is at a standstill, a dirt load penetrating the cassette seal is guided into the first groove of the seal element, where it is then initially received. In particular, this also enables a sequentially controlled filling of the grooves with dirt load from radially outside to radially inside, which then offers advantages when the dirt is subsequently ejected from the grooves, since the path to the exit from the cassette seal can be kept short.

According to a further particularly preferred embodiment of the disclosure, it is possible for the second seal lip and the centrifugal disk to define an annular third channel portion which extends in the axial direction and which also contributes to a controlled sequential filling of the grooves in the radially inward direction.

Furthermore, the disclosure can also be further developed in such a way that the third seal lip is arranged on an annular second sealing portion extending radially inwards and axially from the seal element in the direction of the centrifugal disk, wherein the second sealing portion and the third seal lip define the third groove of the seal element, which improves both the dirt load absorption capacity and the sealing performance.

In a likewise preferred embodiment of the disclosure, it can also be possible for the second sealing portion to bear against a contact portion of the centrifugal disk extending in the axial direction. This allows a further optimization of the sealing performance of the cassette seal.

It may also be advantageous to further develop the disclosure in such a way that the seal element is formed from an electrically conductive material. According to a further preferred embodiment of the subject matter of the disclosure, it is possible for the seal disk and/or the centrifugal disk to be designed as electrically conductive. When rolling bearings are used, e.g. in or on electrical machines, current can pass through. The switching pulses from inverters, for example, lead to the build-up of voltage between the bearing rings of rolling bearings. This voltage is repeatedly reduced by breakdowns. Under unfavorable conditions, current passage damage to raceways and rolling bodies occurs as a result. This creates the risk of premature and unexpected failure of the bearing and thus of the entire electrical machine. This risk can be reduced by creating an electrically conductive cassette seal.

The object of the disclosure is further achieved by a rolling bearing with a cassette seal which is positioned between two bearing rings arranged coaxially with respect to one another and rotatable relative to one another.

BRIEF DESCRIPTION OF THE DRAWINGS

The disclosure is explained in more detail below with reference to figures without limiting the general concept of the disclosure.

In the drawings.

DETAILED DESCRIPTION

Figure 1:
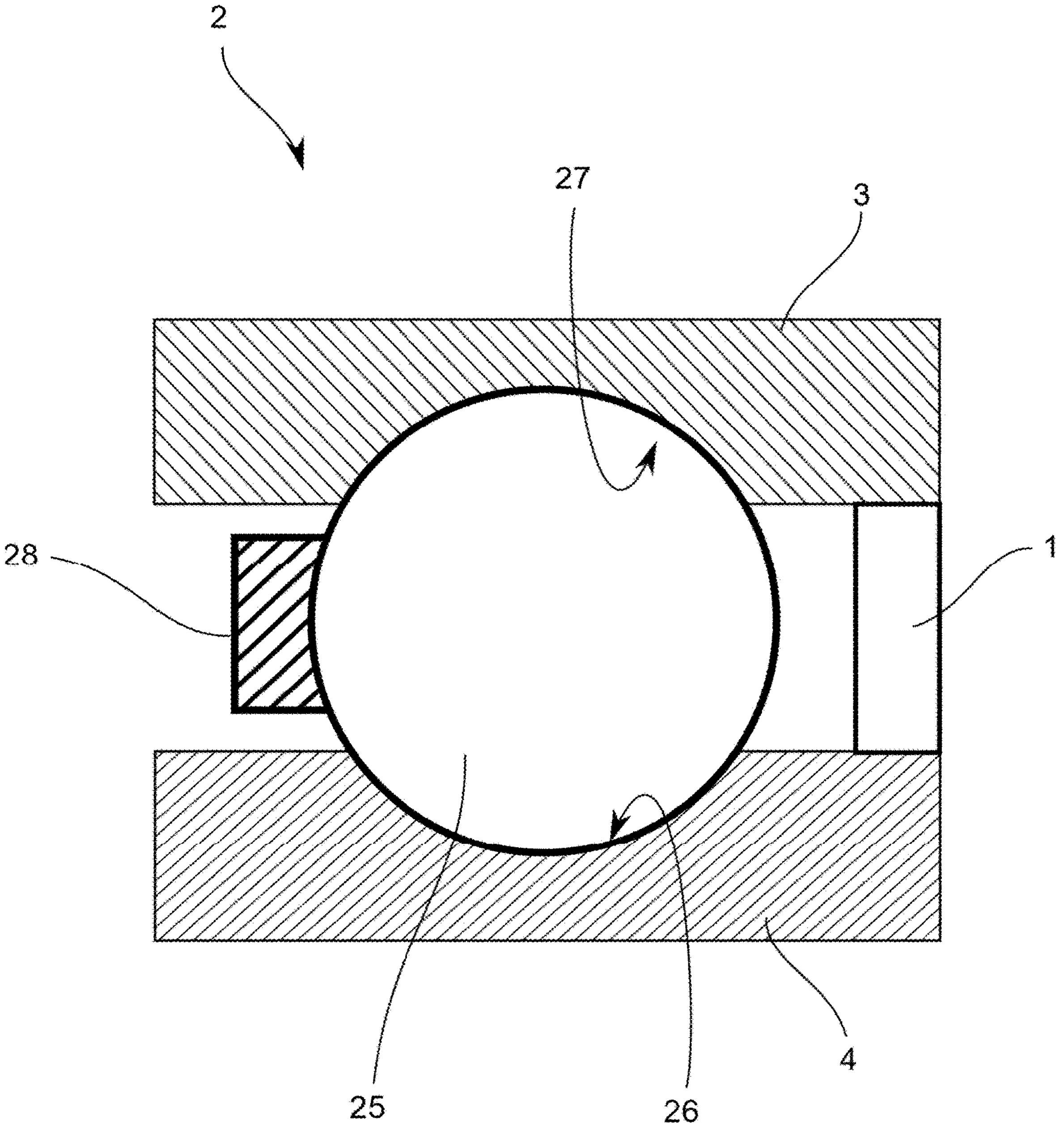
FIG. 1 shows a rolling bearing with a cassette seal in an axial sectional view.

FIG. 1 shows a rolling bearing 2 with a cassette seal 1, which is positioned between two bearing rings 3, 4 arranged coaxially with respect to one another and rotatable relative to one another. The inner bearing ring 4 has an inner ring raceway 26 and the outer bearing ring 3 has an outer ring raceway 27, on which a plurality of rolling bodies 25 arranged between the bearing rings 3, 4 roll. The rolling bodies 25 are guided in a cage 28.

FIGS. 2-5 each show a cassette seal 1 for a rolling bearing 2, which can be positioned between the two bearing rings 3, 4 arranged coaxially with respect to one another and rotatable relative to one another. The cassette seal 1 comprises an annular centrifugal disk 5, which is fixed in a rotationally fixed manner to the inner bearing ring 4, and a seal disk 6, which is fixed in a rotationally fixed manner to the outer bearing ring 3, and an elastic, annular seal element 7 is connected to the seal disk 6. The seal element 7 and the centrifugal disk 5 thus rotate relative to one another in a dynamic operating state of the cassette seal 1.

The seal disk 6 is L-shaped in axial section, with a free leg of the L-shaped seal disk 6 extending radially inwards. The centrifugal disk 5 also has a substantially L-shaped basic form, an axially extending free leg of the centrifugal disk 5 bears against the inner bearing ring 4 and the other free leg extends radially outwards. The free leg extending radially outwards has a portion tapering axially towards the seal disk 6 in the region of the distal end of the free leg extending radially outwards, whereby on the one hand a greater structural stability of the centrifugal disk 5 can be achieved, and on the other hand the labyrinth 11 of the cassette seal can be designed particularly advantageously, which is explained in more detail below.

The seal element 7 has a plurality of contactless seal lips 8, 9, 10, each of which extends from the seal element 7 in the direction of the centrifugal disk 5, such that a labyrinth 11 is defined between the seal element 7 and the centrifugal disk 5.

For this purpose, the seal element 7 in the embodiment shown has a first seal lip 8 extending radially outwards and axially in the direction of the centrifugal disk 5, as well as a second seal lip 9 which is offset radially inwards and axially with respect to the first seal lip 8 in the direction of the centrifugal disk 5 and which extends radially outwards and axially in the direction of the centrifugal disk 5. Furthermore, the seal element 7 has a third seal lip 10 which extends radially outwards and axially in the direction of the centrifugal disk 5 and which is arranged offset radially inwards and axially in the direction of the centrifugal disk 5 with respect to the second seal lip 9. As can be clearly seen from FIGS. 2-5, a stair-like or step-like arrangement of the seal lips 8, 9, 10 is created.

A circumferential first groove 12 extending in the radial direction is formed between the first seal lip 8 and the seal element 7. Analogously, a circumferential second groove 13 extending in the radial direction is also arranged between the second seal lip 9 and the seal element 7. Furthermore, a circumferential third groove 14 extending in the radial direction is also formed between the third seal lip 10 and the seal element 7.

Figure 3:
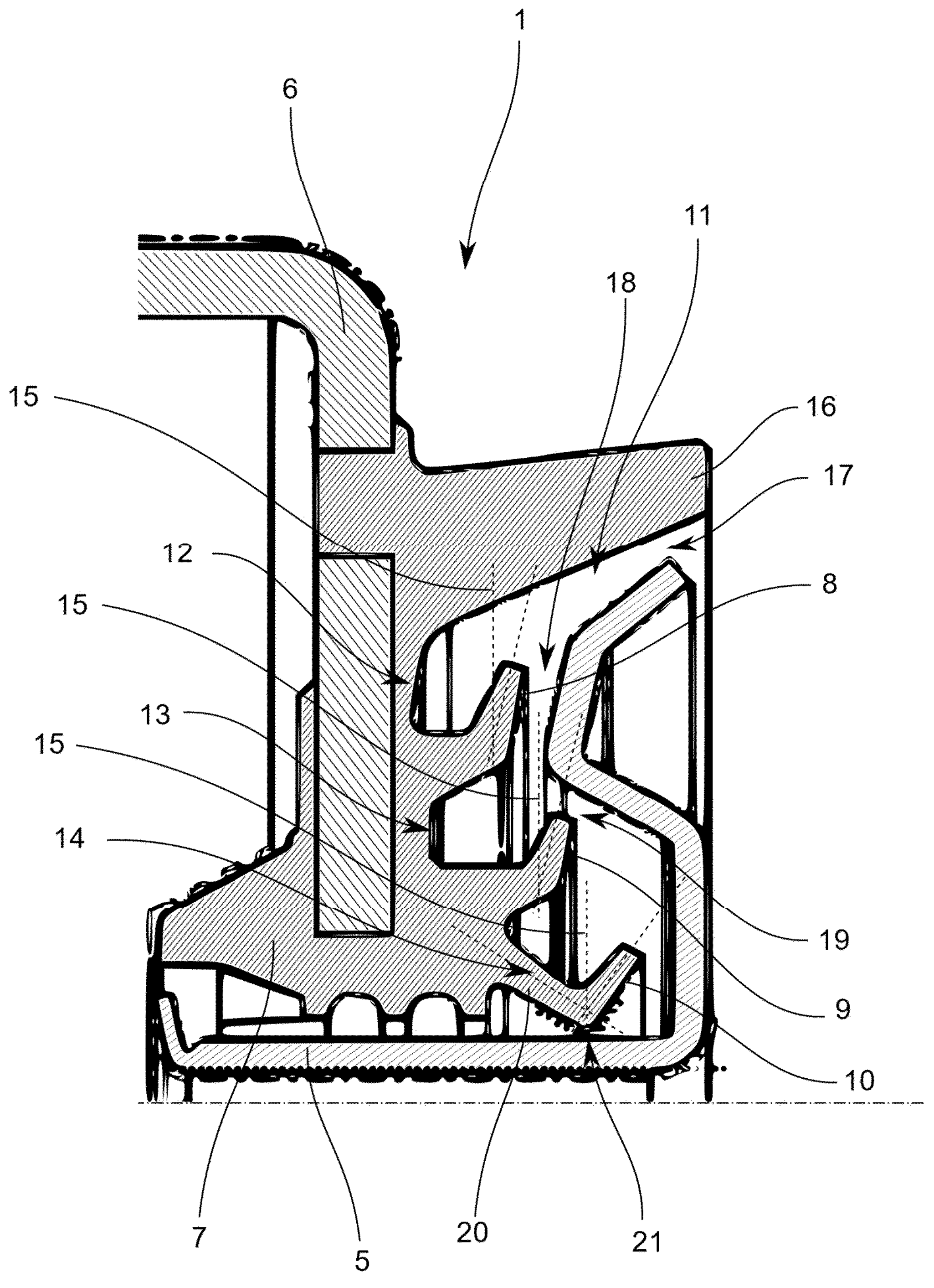
FIG. 3 shows a cassette seal in a second, detailed axial sectional view.

The first seal lip 8 and the second seal lip 9 have an angle with respect to a radial plane 15 which is between 20° and 60°, which can be clearly seen from the illustration of FIG. 3. Preferably, the third seal lip 10 also has an angle with respect to a radial plane 15 which is between 20° and 60°.

It can also be clearly seen from FIGS. 2-5 that the seal element 7 has an annular first sealing portion 16 which is arranged offset radially outwards with respect to the first seal lip 8 and extends axially from the seal element 7 in the direction of the centrifugal disk 5, such that the sealing portion 16 axially covers the centrifugal disk 5 and defines an annular first channel portion 17 between the sealing portion 16 and the centrifugal disk 5, wherein the first channel portion 17 runs towards the first groove 12 of the seal element 7.

Figure 4:
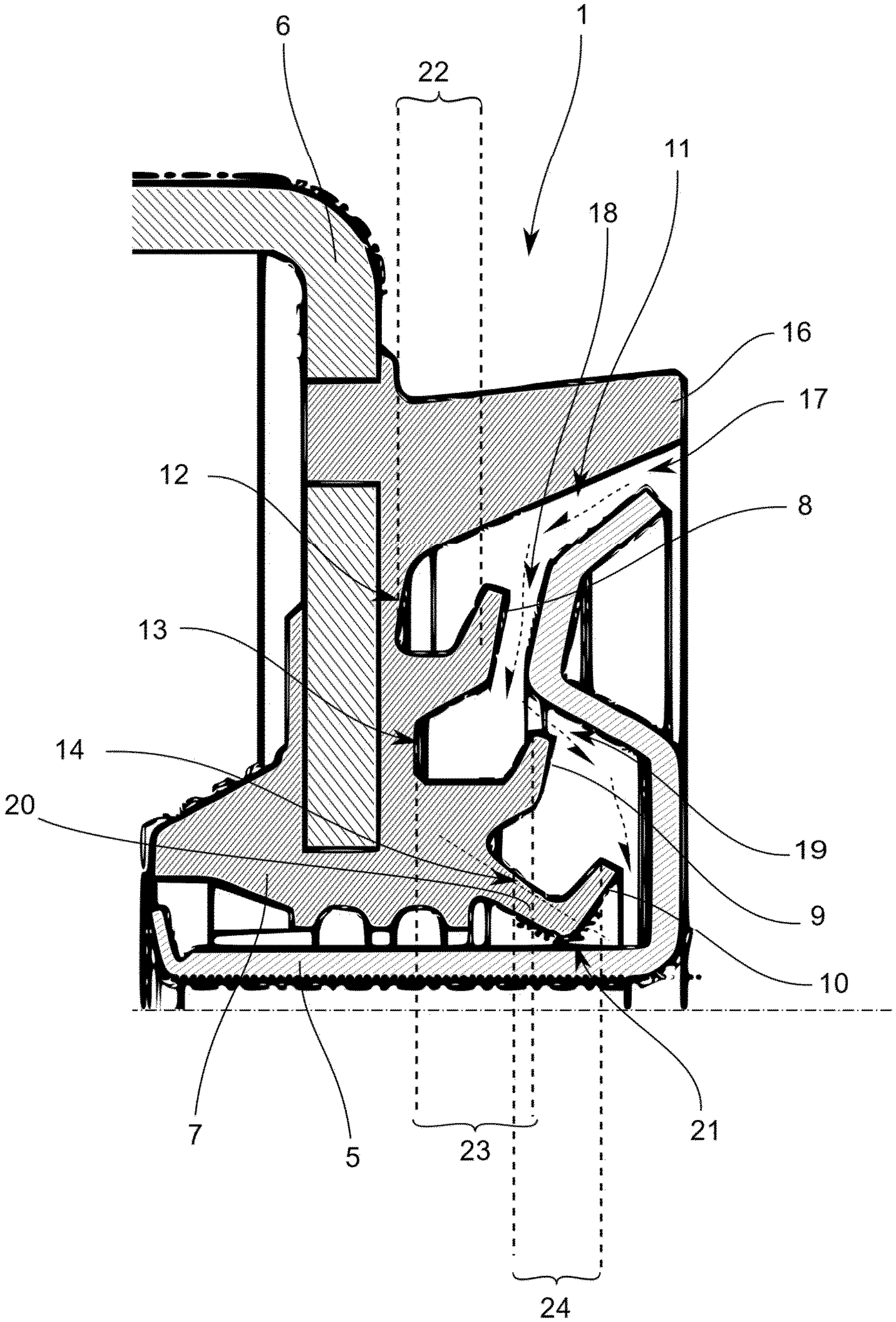
FIG. 4 shows a cassette seal in a static operating state with a dirt load entering the cassette seal, in an axial sectional view.

In a static operating state of the cassette seal 1, a dirt load can penetrate into the labyrinth 11, with this dirt load then being initially guided into the first groove 12 of the seal element 7, which can be clearly understood from FIG. 4, which shows this static operating state of the cassette seal 1. The dirt load and its movement path are indicated by the arrows in FIG. 4. When the dirt load enters, mainly the first groove 12 of the seal element 7 is initially filled.

If the first groove 12 overflows or the dirt load passes through the first groove 12, the first seal lip 8 and the centrifugal disk 5 define an annular second channel portion 18 which extends in the radial direction and which runs towards the second groove 13 of the seal element 7 so that the corresponding dirt load is then guided primarily into the second groove 13.

If this second groove 13 also fills up with the dirt load and/or the dirt load passes through the second groove 13 within the labyrinth 11, it is guided through an annular third channel portion 19 extending in the axial direction from the second seal lip 9 and the centrifugal disk 5. From here, the dirt load can be fed to the third groove 14.

This clearly shows the cascade-like structure and mode of operation of the grooves 12,13,14 as well as the seal lips 8, 9, 10, which is explained in more detail below. If, during the static operating state of the cassette seal 1, a dirt load, for example dust and/or spray water, penetrates into the labyrinth 11 of the cassette seal 1, most of it initially collects in the first groove 12. When this first groove 12 is full, the corresponding dirt load falls into the second groove 13 and then from there into the third groove 14. As soon as these impurities and the water can flow, they flow along these grooves 12, 13, 14 in the circumferential direction and finally flow gradually in the direction of gravity to the bottom of the cassette seal 1 and from there can leave the cassette seal 1. In this way, contaminants can be kept away from the rolling bearing 2. At the same time, the cassette seal 1 is low-friction due to the contactless seal lips 8, 9, 10.

The cascade-like structure of the grooves 12, 13, 14 and the seal lips 8, 9, 10 can also be clearly illustrated by FIG. 4, which shows the axial groove openings 22, 23, 24 of the grooves 12, 13, 14. In particular, the axial overlapping regions of the groove openings 22, 23, 24 can also be clearly seen, so when a groove located radially above fills up, the groove located radially below can catch the dirt load.

In the exemplary embodiment shown, the third seal lip 10 is arranged on an annular second sealing portion 20 extending radially inwards and axially from the seal element 7 in the direction of the centrifugal disk 5, with the second sealing portion 20 and the third seal lip 10 defining the third groove 14 of the seal element 7. The second sealing portion 20 bears against a contact portion 21 of the centrifugal disk 5 extending in the axial direction. This can create a radially inwardly directed spring force, by means of which a defined sealing effect can be set. Furthermore, the sealing portion 20 can be adjusted radially inwards if friction-related abrasion occurs.

Figure 5:
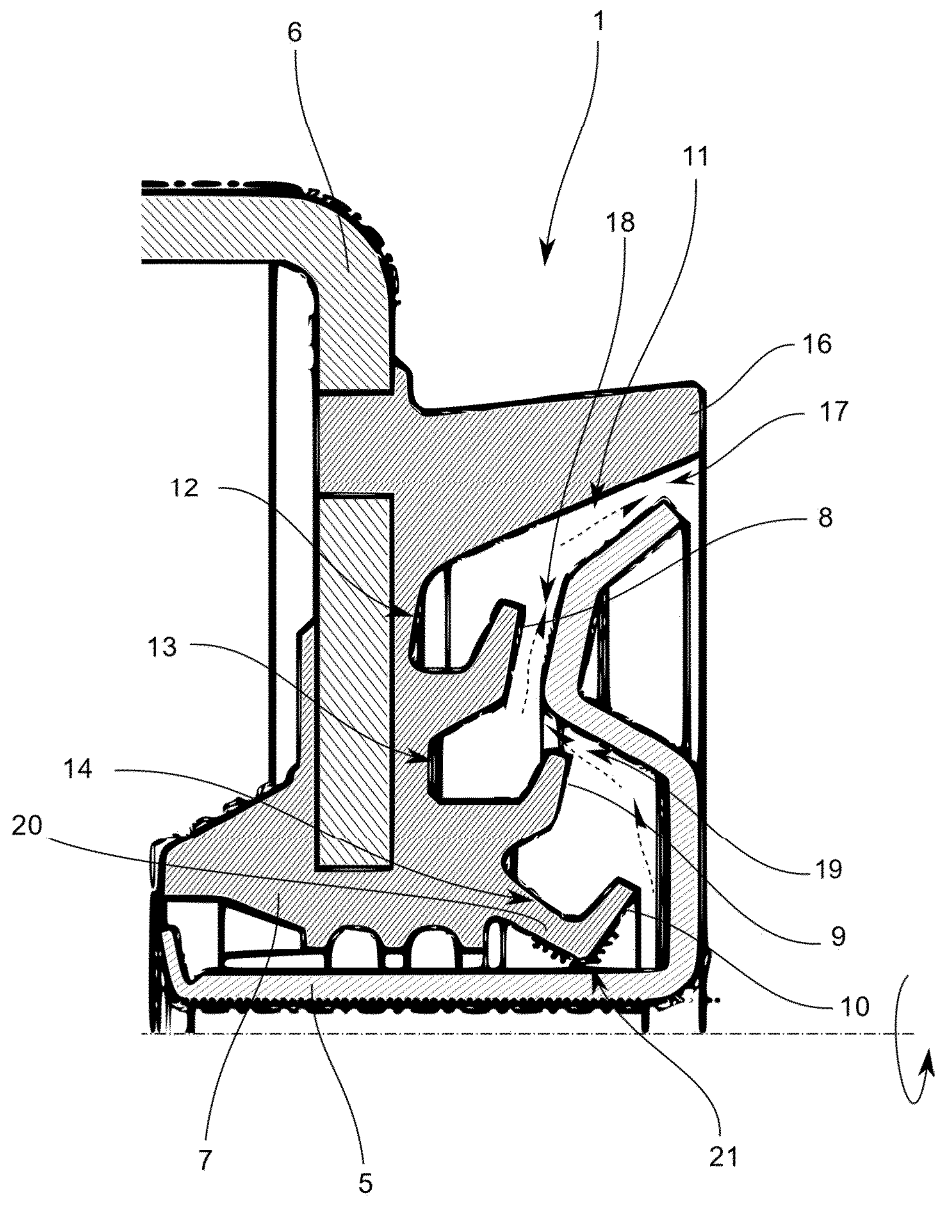
FIG. 5 shows a cassette seal in a dynamic operating state with a dirt load escaping from the cassette seal in an axial sectional view.

FIG. 5 shows the cassette seal 1 in a dynamic operating state in which the centrifugal disk 5 moves in a rotational manner relative to the seal element 7. In this operating state, any dirt load still present in the labyrinth 11 is then flung radially outwards by centrifugal force so that it then exits through the first channel portion 17 of the cassette seal 1, which is also indicated here by the corresponding arrows.

Figure 2:
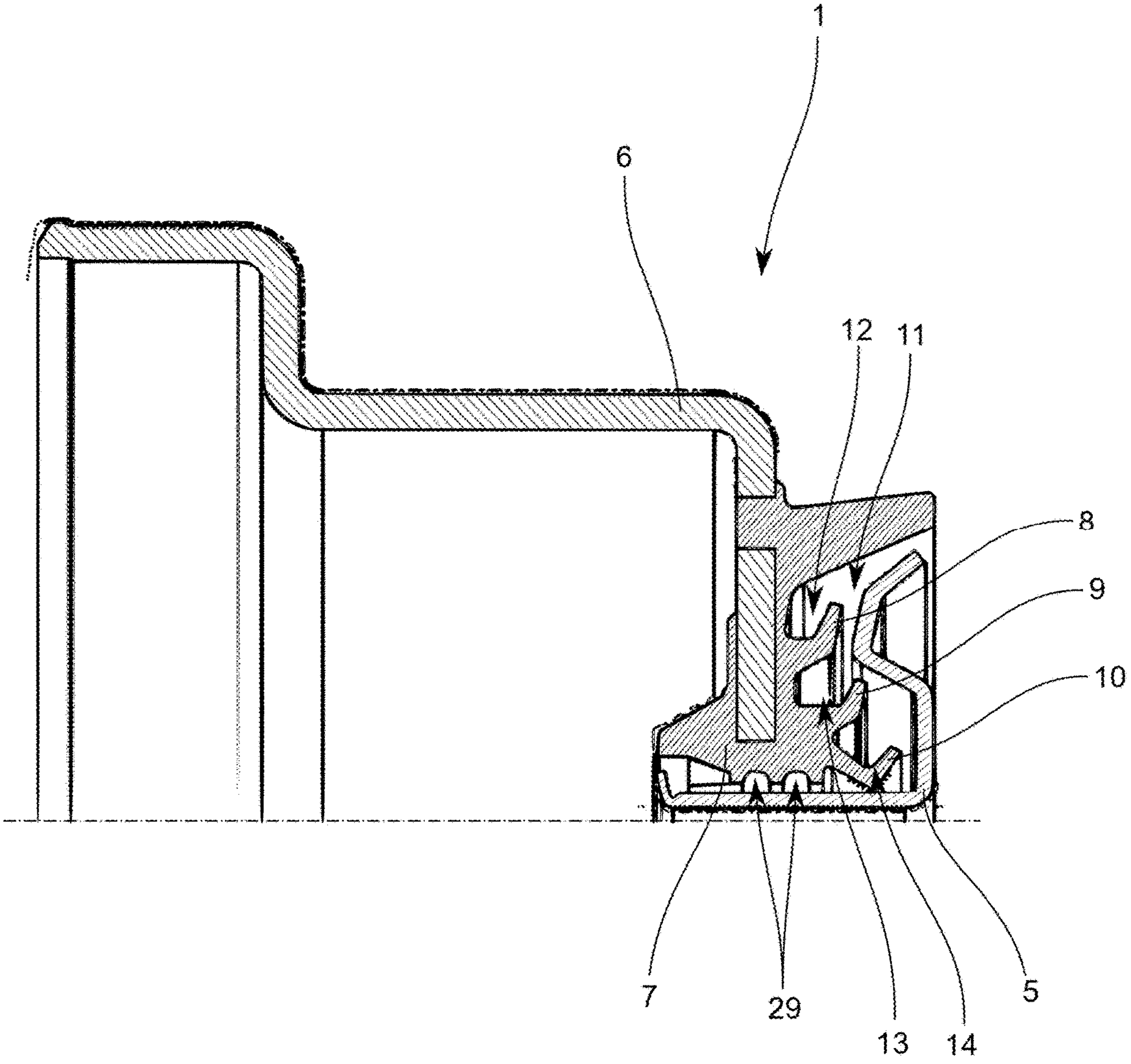
FIG. 2 shows a cassette seal in a first axial sectional view.

The seal element 7 can have two axially spaced circumferential grooves 29 with a circular arc in cross-section on its radially inner lateral surface, which can be clearly seen from FIG. 2. A lubricating grease is introduced into these grooves 29, which fills the volume of the groove 29 to approximately 60%. This creates a circumferential ring-like barrier made of lubricating grease, which represents a good final barrier, particularly against particles and/or water migrating through the labyrinth 11, before they enter the rolling bearing 2, and which can further improve the sealing effect of the cassette seal. During operation of the cassette seal 1, this lubricating grease is flung radially outwards in the direction of the grooves 29 by the centrifugal force of the centrifugal disk 5 and held there.

The disclosure is not limited to the embodiments shown in the figures. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

List of Reference Signs

1 Cassette seal
2 Rolling bearing
3 Bearing ring
4 Bearing ring

5 Centrifugal disk
6 Seal disk
7 Seal element
8 Seal lip
9 Seal lip
10 Seal lip
11 Labyrinth
12 Groove
13 Groove
14 Groove
15 Plane
16 Sealing portion
17 Channel portion
18 Channel portion
19 Channel portion
20 Sealing portion
21 Contact portion
22 Axial groove opening
23 Axial groove opening
24 Axial groove opening
25 Rolling body
26 Inner ring raceway
27 Outer ring raceway
28 Cage
29 Grooves

The invention claimed is:

1. A cassette seal, which can be positioned between two bearing rings which are arranged coaxially with respect to one another and which are rotatable with respect to one another, comprising:
- an annular centrifugal disk, which is fixed in a rotationally fixed manner to one of the bearing rings and
- a seal disk, which is fixed in a rotationally fixed manner to the other of the bearing rings, wherein
- an elastic, annular seal element is connected to the seal disk, and
- the seal element has a plurality of contactless seal lips, each of which extends from the seal element in a direction of the centrifugal disk, such that a labyrinth is defined between the seal element and the centrifugal disk,
- wherein:
- the seal element has a first seal lip extending radially outwards and axially in the direction of the centrifugal disk,
- a second seal lip which is offset radially inwards and axially with respect to the first seal lip in the direction of the centrifugal disk and which extends radially outwards and axially in the direction of the centrifugal disk, and
- a third seal lip which extends radially outwards and axially in the direction of the centrifugal disk and which is arranged offset radially inwards and axially in the direction of the centrifugal disk with respect to the second seal lip, wherein
- a circumferential first groove extending in the radial direction is formed between the first seal lip and the seal element, and
- a circumferential second groove extending in the radial direction is formed between the second seal lip and the seal element,
- a circumferential third groove extending in the radial direction is formed between the third seal lip and the seal element, and
- the seal element has an annular first sealing portion which is arranged offset radially outwards with respect to the first seal lip and which extends in the axial direction from the seal element in the direction of the centrifugal disk, such that the sealing portion radially covers the centrifugal disk and defines an annular first channel portion between the sealing portion and the centrifugal disk, wherein the first channel portion runs towards the first groove of the seal element.

2. The cassette seal according to claim 1, wherein
- the first seal lip and the second seal lip have an angle selected between 20° and 60° with respect to a radial plane.

3. The cassette seal according to claim 1, wherein the first seal lip and the centrifugal disk define a radially extending, annular second channel portion which runs towards the second groove of the seal element.

4. The cassette seal according to claim 1, wherein the second seal lip and the centrifugal disk define an annular third channel portion extending in the axial direction.

5. The cassette seal according to claim 1, wherein the third seal lip is arranged on an annular second sealing portion extending radially inwards and axially from the seal element in the direction of the centrifugal disk, wherein the second sealing portion and the third seal lip define the third groove of the seal element.

6. The cassette seal according to claim 4, wherein the second sealing portion bears against a contact portion of the centrifugal disk extending in the axial direction.

7. The cassette seal according to claim 1, wherein the seal element is formed from an electrically conductive material.

8. The cassette seal according to claim 1, wherein the seal disk and/or the centrifugal disk are electrically conductive.

9. A rolling bearing having a cassette seal which is positioned between the two bearing rings which are arranged coaxially with respect to one another and which are rotatable relative to one another, wherein the cassette seal is designed according to claim 1.

10. A cassette seal, which can be positioned between two bearing rings which are arranged coaxially with respect to one another and which are rotatable with respect to one another, comprising:
- an annular centrifugal disk, which is fixed in a rotationally fixed manner to one of the bearing rings and
- a seal disk, which is fixed in a rotationally fixed manner to the other of the bearing rings, wherein
- an elastic, annular seal element is connected to the seal disk, and
- the seal element has a plurality of contactless seal lips, each of which extends from the seal element in a direction of the centrifugal disk, such that a labyrinth is defined between the seal element and the centrifugal disk,
- wherein:
- the seal element has a first seal lip extending radially outwards and axially in the direction of the centrifugal disk,
- a second seal lip which is offset radially inwards and axially with respect to the first seal lip in the direction of the centrifugal disk and which extends radially outwards and axially in the direction of the centrifugal disk, and
- a third seal lip which extends radially outwards and axially in the direction of the centrifugal disk and which is arranged offset radially inwards and axially in the direction of the centrifugal disk with respect to the second seal lip, wherein
- a circumferential first groove extending in the radial direction is formed between the first seal lip and the seal element, a circumferential second groove extending in the radial direction is formed between the second seal lip and the seal element, and the first seal lip and the centrifugal disk define a radially extending, annular second channel portion which runs towards the second groove of the seal element.

11. A cassette seal, which can be positioned between two bearing rings which are arranged coaxially with respect to one another and which are rotatable with respect to one another, comprising:

an annular centrifugal disk, which is fixed in a rotationally fixed manner to one of the bearing rings and a seal disk, which is fixed in a rotationally fixed manner to the other of the bearing rings, wherein an elastic, annular seal element is connected to the seal disk, and the seal element has a plurality of contactless seal lips, each of which extends from the seal element in a direction of the centrifugal disk, such that a labyrinth is defined between the seal element and the centrifugal disk, wherein:

the seal element has a first seal lip extending radially outwards and axially in the direction of the centrifugal disk, a second seal lip which is offset radially inwards and axially with respect to the first seal lip in the direction of the centrifugal disk and which extends radially outwards and axially in the direction of the centrifugal disk, and a third seal lip which extends radially outwards and axially in the direction of the centrifugal disk and which is arranged offset radially inwards and axially in the direction of the centrifugal disk with respect to the second seal lip, wherein a circumferential first groove extending in the radial direction is formed between the first seal lip and the seal element, a circumferential second groove extending in the radial direction is formed between the second seal lip and the seal element, and wherein the third seal lip is arranged on an annular second sealing portion extending radially inwards and axially from the seal element in the direction of the centrifugal disk, wherein the second sealing portion and the third seal lip define a third groove of the seal element.

12. The cassette seal according to claim 11, wherein the second sealing portion bears against a contact portion of the centrifugal disk extending in the axial direction.

* * * * *